United States Patent
Glatfelter et al.

(10) Patent No.: US 6,606,220 B1
(45) Date of Patent: Aug. 12, 2003

(54) SYSTEMS AND METHODS FOR PROVIDING BEGINNING-OF-TAPE AND END-OF-TAPE INDICATORS

(75) Inventors: William Glatfelter, Westborough, MA (US); George A. Saliba, Northboro, MA (US); Satya Mallick, Milford, MA (US); Chan Kim, North Attleboro, MA (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/330,406

(22) Filed: Jun. 11, 1999

(51) Int. Cl.$^7$ .............................. G11B 5/78; G11B 5/66; G11B 5/70
(52) U.S. Cl. ................................ 360/134; 428/694 TB; 428/694 TR
(58) Field of Search .................... 360/74.6, 134; 250/570; 428/694 TB, 694 TR

(56) References Cited

U.S. PATENT DOCUMENTS

| | | | | |
|---|---|---|---|---|
| 3,662,120 A | * | 5/1972 | Hess | 360/62 |
| 4,170,683 A | * | 10/1979 | Miklos | 428/336 |
| 4,380,032 A | * | 4/1983 | Pfost | 360/74.6 |
| 4,578,729 A | * | 3/1986 | Suzuki et al. | 360/134 |
| 4,848,698 A | * | 7/1989 | Newell et al. | 242/347 |
| 4,884,260 A | * | 11/1989 | Bouldin et al. | 369/93 |
| 4,983,496 A | * | 1/1991 | Newell et al. | 430/270 |
| 5,369,631 A | * | 11/1994 | Hwang | 369/113 |
| 5,487,058 A | | 1/1996 | Kitabayashi | 369/112 |
| 5,674,583 A | * | 10/1997 | Nakayama et al. | 428/64.4 |
| 5,976,668 A | * | 11/1999 | Chiba et al. | 428/141 |
| 6,018,434 A | * | 1/2000 | Saliba | 360/74.6 |
| 6,084,740 A | | 7/2000 | Leonhardt et al. | |
| 6,103,365 A | * | 8/2000 | Ishii et al. | 428/332 |
| 6,236,529 B1 | | 5/2001 | Leonhardt et al. | |
| 6,433,951 B1 | * | 8/2002 | Lubratt | 360/77.12 |

FOREIGN PATENT DOCUMENTS

| | | | | | |
|---|---|---|---|---|---|
| CH | 563635 A | * | 6/1975 | | G09F/7/04 |
| DE | 32 01 935 A1 | * | 8/1983 | | |
| EP | 598503 A2 | * | 5/1994 | | G11B/13/04 |
| JP | 54097407 A | * | 8/1979 | | G11B/5/09 |
| JP | 56033751 A | * | 4/1981 | | G06F/13/04 |
| JP | 61009819 A | * | 1/1986 | | G11B/5/627 |
| JP | 62264422 A | * | 11/1987 | | G11B/5/627 |
| JP | 01155514 A | * | 6/1989 | | G11B/5/627 |
| JP | 04311807 A | * | 11/1992 | | G11B/5/627 |
| JP | 04311808 A | * | 11/1992 | | G11B/5/627 |
| JP | 06004848 A | * | 1/1994 | | G11B/5/627 |
| JP | 10003653 A | * | 1/1998 | | G11B/5/78 |
| JP | 10232823 | | 9/1998 | | |

OTHER PUBLICATIONS

"Photocell Filter Combination", Mar. 1962, IBM TDB, vol. No. 3, ISS. No. 10, p. 27.*
"Optimized Tape Mark Detector", May 1970, IBM TDB, vol. No. 12, ISS. No. 12, pp. 2354–2355.*
"Magnetic Tape Sensing", Jun. 1971, IBM TDB, vol. No. 14, ISS. No. 1, pp. 58–59.*

* cited by examiner

Primary Examiner—William Klimowicz
(74) Attorney, Agent, or Firm—Morrison & Foerster LLP

(57) ABSTRACT

The invention relates to a method for creating beginning-of-tape (BOT) and end-of-tape (EOT) indicators on a magnetic tape by altering a discrete area or areas of the recording area or the non-recording area of a magnetic tape, such that the area or areas are optically detectable. The invention provides a method for creating BOT and EOT indicators by removing a discrete area or areas of the ferromagnetic layer or the non-ferromagnetic layer of a magnetic tape, such that the mark reflects or transmits light differently than unmarked portions of the tape. The invention also provides a method for creating BOT and EOT indicators by placement of a fluorescent or optical dye on the ferromagnetic layer or non-ferromagnetic layer of a magnetic tape. Such fluorescent or optical dye is optically detectable, and further reduces any physical distortion in the magnetic tape.

22 Claims, 4 Drawing Sheets

SYSTEMS AND METHODS FOR PROVIDING BEGINNING-OF-TAPE AND END-OF-TAPE INDICATORS

FIELD OF THE INVENTION

The invention relates to magnetic tape having markers at the beginning and end of the tape for indicating to a recording device that a tape boundary is approaching. More particularly, it relates to optically detectable beginning-of-tape (BOT) and end-of-tape (EOT) indicators on the magnetic tape.

BACKGROUND OF THE INVENTION

Today's tape drives can wind tape at remarkably high speeds. Although these high speeds decrease the amount of time required to store and read archived data, the tape is subjected to considerable physical stress during acceleration and deceleration of the reel. Furthermore, the tape may be torn from the reel if the end of the tape is reached at high speed. Devices that record data onto magnetic tape benefit from markers indicating that the beginning or end of the tape is approaching so that the acceleration or deceleration may be controlled to minimize the force applied to the tape. Such markings are referred to as beginning-of-tape (BOT) and end-of-tape (EOT) indicators. A common method for creating BOT and EOT indicators is to create a physical hole in the magnetic tape at an appropriate location. These holes are detected by an optical transmitter/receiver as the area of the tape containing the hole passes the transmitter/receiver.

Creating physical holes in the magnetic tape is, however, highly disadvantageous, because the presence of such holes creates a physical distortion in the magnetic tape associated with various readback problems. As the tape winds onto a takeup or supply reel, the next several wraps are unsupported over the area of the hole. The tape acquires a physical deformation, called embossing marks, which roughly approximate the geometry of the hole. Multiple embossing marks are created in the tape, with a spacing approximately equal to the circumference of the reel. These marks diminish with increasing distance from the hole.

Embossing marks are associated with data readback errors. They create distortions in the readback signal which can lead to amplitude-or timing-related errors. Also, the physical deformation of the tape can cause the tape to move away from the reading head. In addition, loose debris can accumulate around the edges of the BOT and EOT holes, which can transfer to the tape recording head and can cause readback errors.

SUMMARY OF THE INVENTION

Accordingly, an object of the present invention is to provide BOT and EOT indicators which do not result in embossing marks on the magnetic tape.

Another object of the present invention is to provide BOT and EOT indicators which are detectible by an optical transmitter/receiver.

The objects above are accomplished by the alteration of one or more discrete areas of the recording layer or the non-recording layer of the magnetic tape. The removal of one or more discrete areas of either the recording layer or the non-recording layer of the magnetic tape results in a marking detectible by an optical transmitter/receiver. Alternatively, the placement of a fluorescent or optical dye on the recording layer or the non-recording layer of the magnetic tape results in a marking detectable by an optical transmitter/receiver.

The systems and methods described herein further provide methods for creating BOT and EOT indicators by removing a discrete area or areas of the recording layer or the non-recording layer of a magnetic tape, such that an optical signal is detectible through the remaining layers of the magnetic tape.

The systems and methods described herein also provide a method for creating BOT and EOT indicators by placement of a fluorescent or optical dye on the recording layer of a magnetic tape. Such a fluorescent or optical dye is optically detectible, and further eliminates any physical distortion in the magnetic tape.

BRIEF DESCRIPTION OF THE FIGURES

The following figures depict certain illustrative embodiments of the invention in which like reference numerals refer to like elements. These depicted embodiments are to be understood as illustrative of the invention and not as limiting in any way.

DETAILED DESCRIPTION OF THE ILLUSTRATED EMBODIMENTS

The description below pertains to several possible embodiments of the invention. It is understood that many variations of the systems and methods described herein may be envisioned by one skilled in the art, and such variations and improvements ate intended to fall within the scope of the invention. Accordingly, the invention is not to be limited in any way by the following disclosure of certain illustrative embodiments.

The systems and methods described herein provide marks on magnetic tape which indicate an approaching tape boundary but do not damage other portions of the tape when wound on a reel. Such markings allow a device to adjust the winding speed of the tape to minimize stress and damage to the tape during recording and reading. In certain embodiments, the marks result from physical removal of a portion of a layer of the tape. In certain other embodiments, the marks result from the addition of a dye to a layer of the tape.

Figure 1:
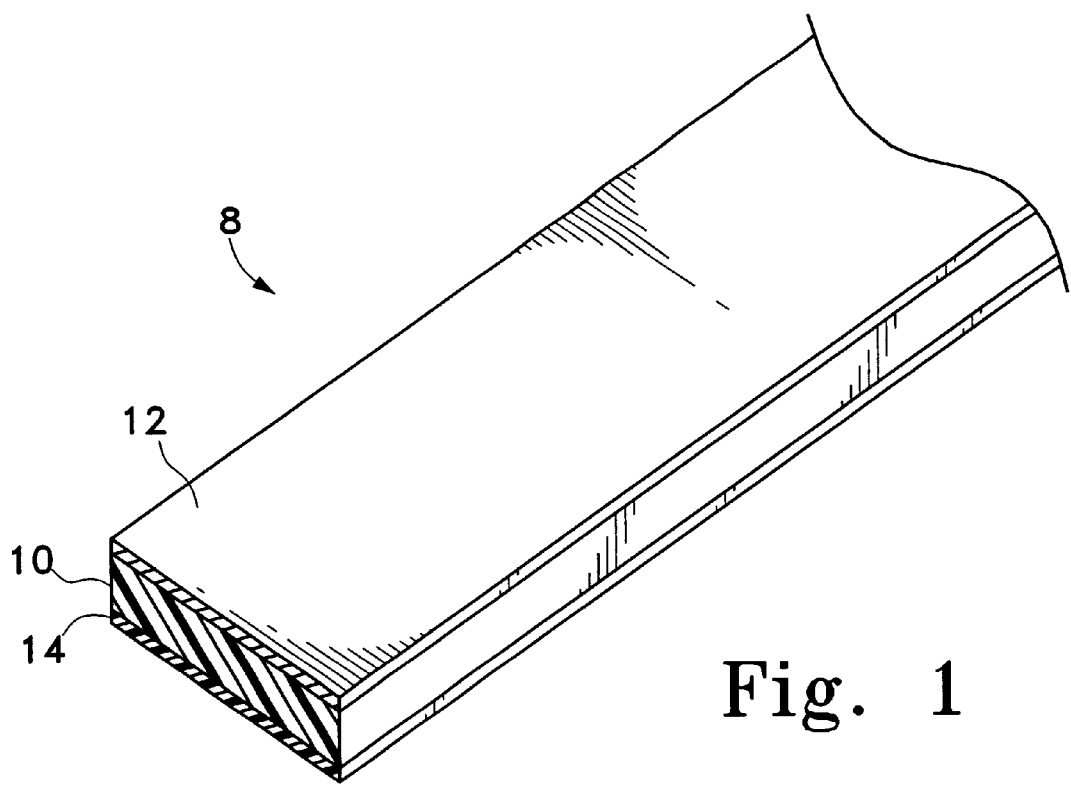
FIG. 1 depicts one embodiment of the magnetic tape.

FIG. 1 depicts a magnetic tape 8 comprising a substrate 10 having provided thereon a ferromagnetic layer 12 as a top layer. The ferromagnetic layer 12 serves as a recording surface. The substrate 10 carries on the reverse side a non-ferromagnetic layer 14. The non-ferromagnetic layer 14 serves as a non-recording surface. A non-ferromagnetic layer is optional for the systems and methods described herein, and magnetic tapes comprising a substrate and a ferromagnetic layer are held to be within the scope of the systems and methods described herein.

The substrate 10 can be made of any conventional materials known for magnetic tape, such as those described in Japanese Patent Laid-Open No. 35246/97, column 2, lines 30–42. Of the materials described, nonmagnetic materials such as polyethylene terephthalate (PET), polyethylene naphthalate (PEN), and polyamide are particularly well suited. The substrate 10 preferably has a thickness of 6 µm or less, particularly 5 µm or less, for achieving a high recording capacity. A layer for easy adhesion can be provided on the surface of the substrate 10 for improving adhesion to other layer.

The non-ferromagnetic layer 14 should be composed of a material which has satisfactory running properties, suitable anti-static properties, and is capable of receiving BOT/EOT markings. Satisfactory running properties may be conferred by utilizing a material having a moderate surface roughness. On the other hand, it is preferred for the non-ferromagnetic layer 14 to be as smooth as possible to prevent the surface profile of the non-ferromagnetic layer 14 from being transferred to the ferromagnetic layer when the magnetic tape is rolled up.

Black powder, such as carbon black, may be included in the non-ferromagnetic layer and has high light-shielding properties. If such black powder is added to the non-ferromagnetic layer 14 in large proportion, the non-ferromagnetic layer 14 may not sufficiently transmit light, which is unfavorable when markings in the ferromagnetic layer rely on transmitted light for BOT/EOT mark reading. In this case, it is recommended not to use such black particles at all or to use non-black particles in combination with black particles.

The ferromagnetic layer 12 is formed by applying a magnetic coating composition comprising ferromagnetic powder and a binder. Namely, the magnetic tape 8 is a magnetic tape of coated type. Ferromagnetic powders which can be used include acicular, spindle-shaped or tabular particles. Acicular or spindle-shaped ferromagnetic powder includes ferromagnetic metal powder consisting mainly of iron and ferromagnetic iron oxide powder, and tabular ferromagnetic powder includes ferromagnetic hexagonal ferrite powder. The ferromagnetic layer 12 can contain abrasive grains, carbon black, lubricants, hardeners, etc. in addition to the magnetic powder and the binder.

The total thickness of the magnetic tape 8 is less than about 7 to 9 µm, preferably from 4.5 to 6.8 µm. That is, the magnetic tape may be of extremely thin type. In general, stiffness of a magnetic tape decreases with reduction in thickness. Decreased stiffness tends to reduce the contact of the magnetic tape with a magnetic head, which can result in a reduction of output. Where the magnetic tape 8 includes a metallic thin layer which has high stiffness, the magnetic tape has high stiffness despite its small thickness. Therefore, embodiments wherein a metallic thin layer is provided are advantageous in that increase in recording capacity by reduction in total thickness can be accomplished without incurring the problem of stiffness reduction.

The magnetic tape 8 may further include on the side of the non-recording surface thereof a thin film of a metal or an alloy having a low melting point (hereinafter referred to as a metallic thin layer) and a non-ferromagnetic layer 14 as a resin layer adjoining the metallic thin layer. In embodiments including such a metallic thin layer, BOT/EOT indicators may rely on reflection, rather than transmission, of a light signal. Where the magnetic tape 8 has the metallic thin layer, the layer also serves for static prevention. That is, the non-ferromagnetic layer 14 does not need to contain carbon black or any other conductive inorganic particles when a metallic layer is used.

Additional descriptions of magnetic tape and information useful for manufacturing suitable magnetic tapes may be found in copending U.S. application Ser. No. 09/191,321, now abandoned, which is hereby incorporated by reference.

Figure 2:
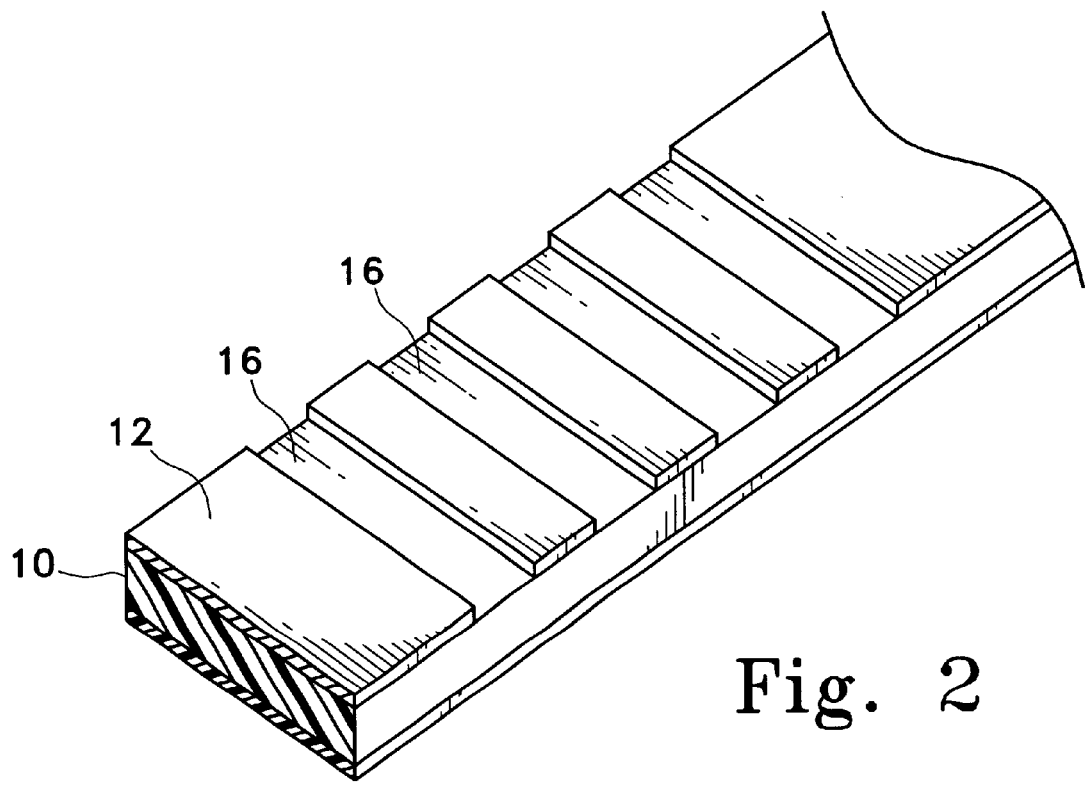
FIG. 2 depicts a magnetic tape with discrete areas of the recording layer removed.

FIG. 2 depicts a magnetic tape 8 marked with discrete areas 16 removed from the ferromagnetic layer 12. The marks depicted represent one possible pattern for marks, although any other pattern of optically detectable marks, including a single mark, is within the scope of the systems and methods described herein. The discrete areas 16 may extend across the width of the substrate 10 from one edge to the other, or any portion of the width sufficient to provide an optically detectible marker. The discrete areas 16 depicted in FIG. 2 may extend along the longitudinal axis of the tape for any distance appropriate to create an optically detectible marker. The depth of the removed areas may be equivalent to the thickness of the ferromagnetic layer 12, or any depth sufficient to create an optically detectable marker. Additionally, any number of areas may be removed as is desirable or necessary.

Figure 3:
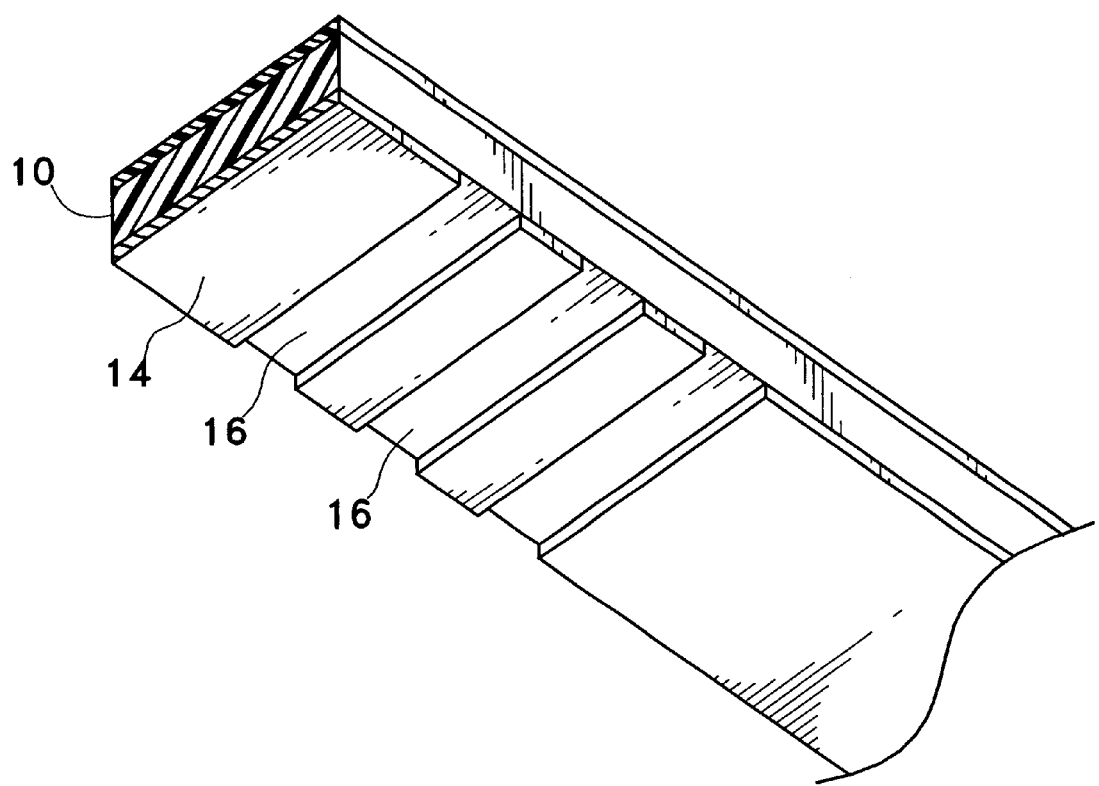
FIG. 3 depicts a magnetic tape with discrete areas of the non-recording layer removed.

FIG. 3 depicts discrete areas 16 removed from the non-ferromagnetic layer 14. The marks depicted represent one possible pattern for marks, although any other pattern of optically detectable marks, including a single mark, is within the scope of the systems and methods described herein. The discrete areas 16 extend across the width of the substrate 10 from one edge to the other, although the markings may extend across any portion of the width sufficient to create an optically detectable marker. The discrete areas 16 as depicted in FIG. 3 may extend along the longitudinal axis of the tape for any distance appropriate to create an optically detectible marker. The depth of the removed areas is equivalent to the thickness of the non-ferromagnetic layer 14, although the markings may be of any depth sufficient to provide an optically detectable marker. Additionally, any number of areas may be removed as is necessary or desirable.

Figure 4:
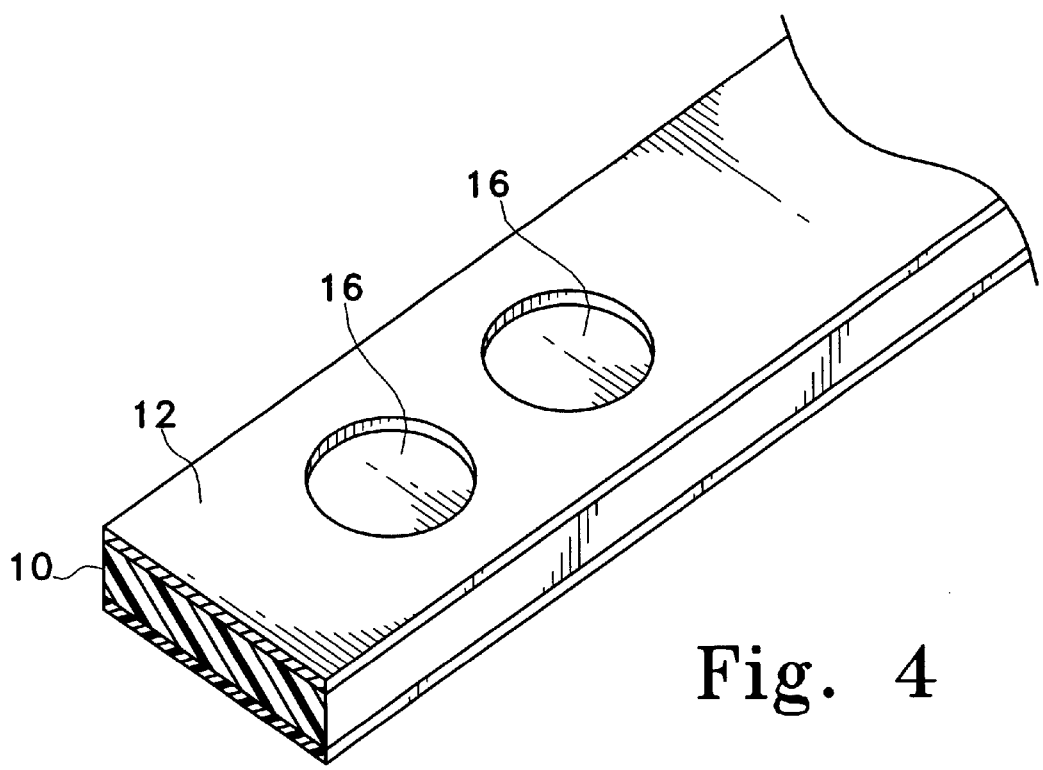
FIG. 4 depicts a second embodiment of the magnetic tape with discrete areas of the recording layer removed.

FIG. 4 depicts yet another embodiment of the systems and methods described herein. The discrete areas 16 may be circular, oval, or any other shape appropriate to create an optically detectible marker. The discrete areas as depicted in FIG. 4 may extend to both edges of the substrate 10, although the areas may extend only a portion of this distance sufficient to provide an optically detectable marker. The depth of the discrete areas may be equivalent to the thickness of the ferromagnetic layer 12, although the markings may be of any depth sufficient to provide an optically detectable marker. In addition, any number of discrete areas may be removed from the substrate as necessary or desirable.

As can be inferred from the above description, any marks which alter an optical property of the tape without perforating the substrate are held to be within the scope of the systems and methods described herein. Any number of marks may be used, and the marks may be of any shape, size, or depth that permits detection of the marks. The marks may be located on any portion of either the ferromagnetic or non-ferromagnetic layer of the tape.

A mark may be made in the ferromagnetic layer of a magnetic tape 8 by dissolving a portion of the ferromagnetic layer with an organic solvent and removing the dissolved portion. A mark may similarly be made alternatively or additionally in the non-ferromagnetic layer by this same process. The organic solvent used may be tetrahydrofuran, methylene chloride, ether, acetone, toluene, or any organic solvent or mixture of two or more such solvents capable of dissolving the appropriate layer. The chemical solvent may be applied in an amount sufficient to dissolve or moisten the area desired to be removed without affecting adjacent areas of the surface or compromising the stability of the substrate.

Figure 5:
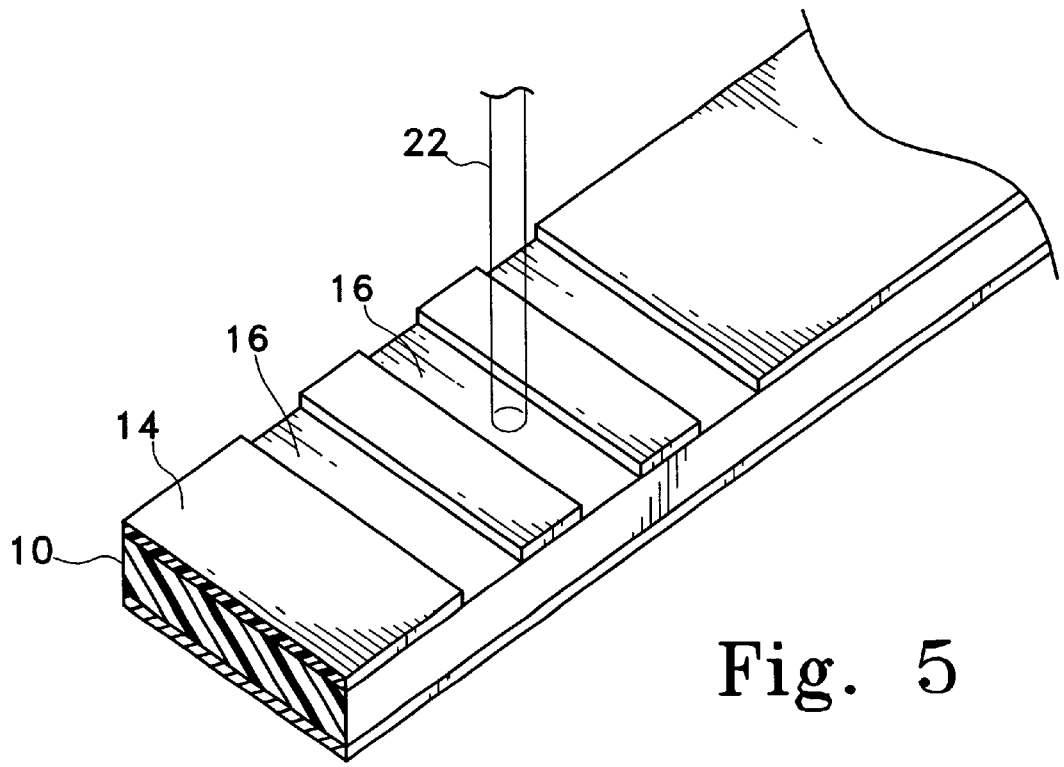
FIG. 5 depicts a process that employs laser light to remove discrete areas of a layer disposed on the tape.

FIG. 5 depicts a process for removing a discrete area of the non-ferromagnetic layer 14 by irradiating the layer with laser light. Marks may be formed analogously in the ferromagnetic layer 12, either additionally or alternatively to marks in the non-ferromagnetic layer 14. In the depicted example, a laser is used to remove a discrete area by an engraving process that irradiates the non-ferromagnetic layer, e.g., a carbon black layer, with an energy beam, such as an electron beam, a particle beam, or any laser beam of suitable wavelength, such as an ultraviolet laser light beam, for example, in the range of 260–300 nm. The pits so formed provide optically detectable marks. The laser engraving process provides for the formation of marks from 1 to 10 microns to any size desired for the marks.

Figure 6:
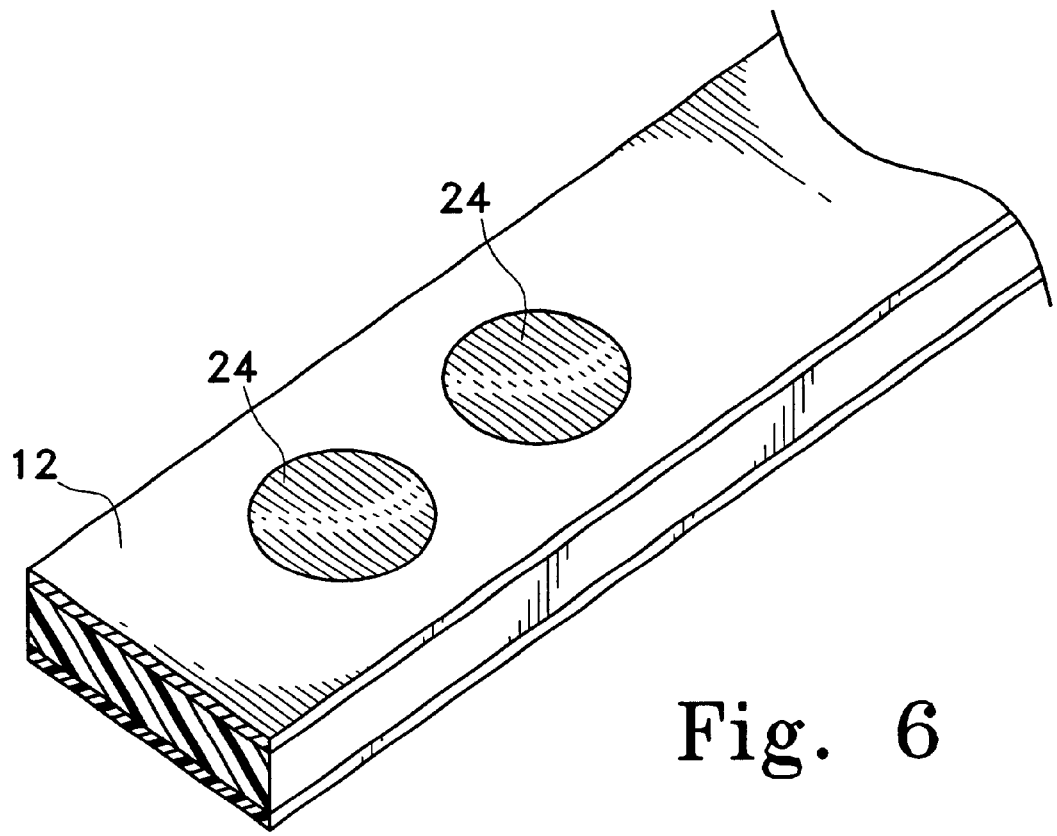
FIG. 6 depicts an optically detectible dye disposed on the tape.

FIG. 6 depicts an optically detectible marker on the ferromagnetic layer 12. An optically detectible dye 24 is applied to the ferromagnetic layer 12, creating an optically detectible mark. Examples of preferred dyes include organic coloring matters, such as cyanine dyes, squarylium dyes, chroconium dyes, azulenium dyes, triarylamine dyes, anthraquinone dyes or pigments, metallized azo dyes or pigments, dithiol metal complex dyes, indoaniline metal complex dyes; phthalocyanine pigments, naphthalocyanine pigments, porphyrin pigments, and intramolecular charge transfer complexes. These dyes can be used either individually or as a mixture of two or more thereof. This method has the advantage of reducing physical deformation of the magnetic tape. A similar strategy may be employed by additionally or alternatively marking the non-ferromagnetic layer 14. Furthermore, in embodiments lacking a non-ferromagnetic layer, the mark may be applied directly to the substrate.

Figure 7:
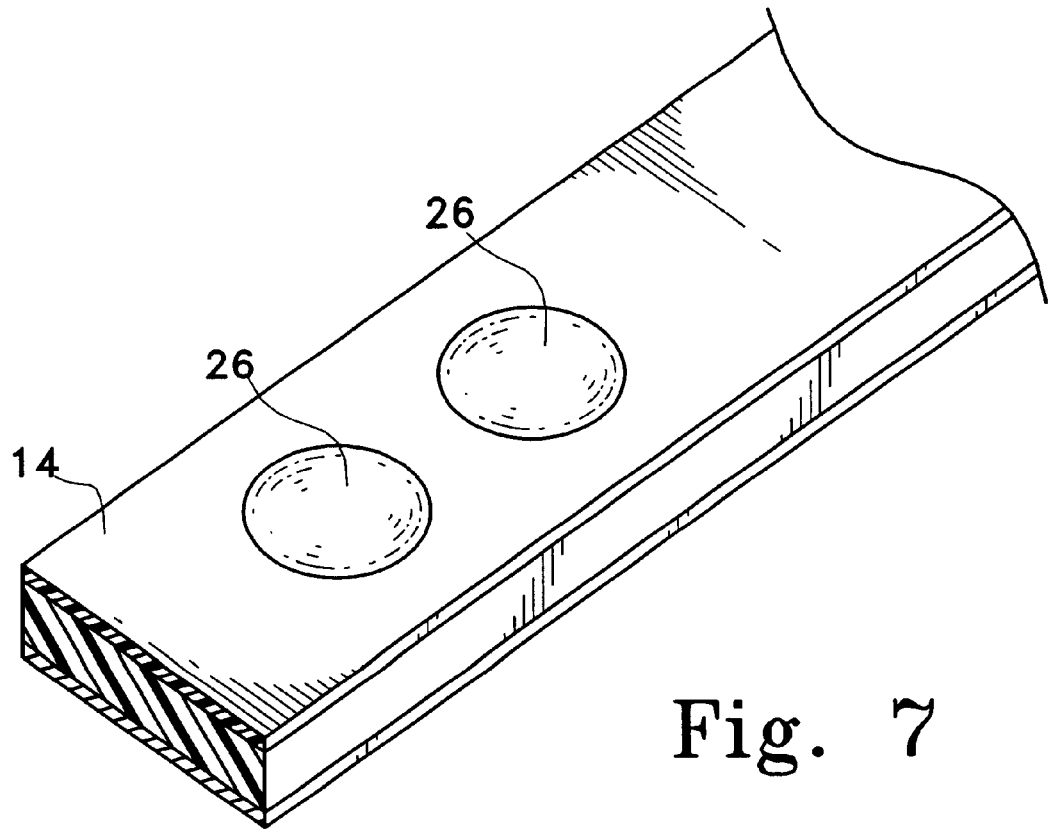
FIG. 7 depicts fluorescent dye disposed on the tape.

FIG. 7 depicts a fluorescent dye 26 applied to the non-ferromagnetic layer 14, creating an optically detectible area. The fluorescent dye used may be a fluorescein dye, a rhodamine dye, or any other fluorescent dye known to those of skill in the art. This method also has the advantage of reducing physical deformation of the magnetic tape. An analogous strategy may be employed by marking the ferromagnetic layer 12 additionally or alternatively. Furthermore, in embodiments lacking a non-ferromagnetic layer, the mark may be applied directly to the substrate.

As may be inferred from the abovedescribed methods, any optically detectable mark included on the tape that does not perforate the tape or otherwise result in substantial damage to the tape is intended to be encompassed by the systems and methods disclosed herein.

The optical contrast used for detecting BOT/EOT marks may be the result of a difference in intensity of either transmitted light or reflected light. In other words, the marks may be either more transmissive or more reflective than unmarked portions of the tape.

Where the contrast of transmitted light intensity is used for BOT/EOT marks, the intensity of transmitted light is detected and processed by an optical mechanism. In using the contrast of reflected light intensity, the intensity of reflected light is detected and processed similarly.

Light transmitted through the mark, or reflected by a layer beneath the mark, is detected by a light detector. The transmitted or reflected light which indicates the mark is converted to electrical signals in a light detector and sent to a processor which controls the tape-reading device in a manner appropriate to the mark detected. For embodiments using dyes, the wavelength of the light used to detect the marks is selected appropriately for the color of the dye(s) used.

Where transmitted light is used for reading BOT/EOT marks, it is preferable for the unmarked magnetic tape 8 to have a transmission of 3% or higher, particularly 5% or higher, at the wavelength of the light to be used for reading the BOT/EOT marks. A higher transmission is better with no particular upper limit, but a practical maximum of the transmission of the whole magnetic tape 8 would be about 40%, being limited by the low light-transmitting properties of the ferromagnetic layer 12.

For achieving precise control, it is preferred that the change in transmission at the wavelength of incident light used for BOT/EOT mark reading between marked and unmarked portions of the tape be 10% or more, particularly 40% or more, as determined by Equation (1) below, $$\text{change in transmission (\%)} = \frac{|T_M - T_o|}{T_M} \times 100 \qquad (1)$$

wherein $T_o$ represents a transmission (%) of a BOT/EOT mark at the wavelength of incident light, and TM represents a transmission (%) of an unmarked area at the wavelength of incident light.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

What is claimed is:

1. A magnetic tape, comprising:
    a substrate having a recording side comprising a ferromagnetic layer and a non-recording side comprising a non-ferromagnetic layer and a metallic layer, the non-ferromagnetic layer having at least one portion altered to create a mark in conjunction with the metallic layer, and the ferromagnetic layer having at least one portion removed to create a mark.

2. The magnetic tape of claim 1, wherein mark in the non-ferromagnetic layer is optically detectable.

3. The magnetic tape of claim 1, wherein the non-ferromagnetic layer comprises a resin.

4. The magnetic tape of claim 1, wherein the non-ferromagnetic layer does not contain conductive inorganic particles.

5. The magnetic tape of claim 1, wherein the ferromagnetic layer comprises at least one of acicular particles, spindle-shaped particles, and tabular particles.

6. The magnetic tape of claim 1, wherein the non-ferromagnetic layer is substantially smooth.

7. The magnetic tape of claim 1, wherein the mark in the non-ferromagnetic layer comprises light reflection off of the metallic layer.

8. The magnetic tape of claim 1, wherein an altered portion of the non-ferromagnetic layer comprises a hole in the non-ferromagnetic layer which permits light reflection off of the metallic layer.

9. The magnetic tape of claim 8, wherein the hole has a depth that is substantially equivalent to a depth of the non-ferromagnetic layer.

10. The magnetic tape of claim 8, wherein the hole has a depth that is less than a depth of the non-ferromagnetic layer.

11. A magnetic tape comprising:

a ferromagnetic layer applied to a first side of a substrate, the ferromagnetic layer having at least one portion removed to create a mark;

a metallic layer applied to a second side of the substrate; and a non-ferromagnetic layer that adjoins the metallic layer, the non-ferromagnetic layer having areas thereof removed that permit light reflection off of the metallic layer.

12. The tape of claim 11, wherein the light reflection off of the metallic layer is optically discernable.

13. The tape of claim 11, wherein the areas are arranged in a pattern.

14. The tape of claim 13, wherein the pattern is circular.

15. The tape of claim 13, wherein the pattern is oval.

16. The tape of claim 11, wherein the areas have a width equal to a width of the substrate.

17. The tape of claim 11, wherein the areas have a width less than a width of the substrate.

18. The tape of claim 11, wherein the areas have a depth equal to a thickness of the non-ferromagnetic layer.

19. The magnetic tape of claim 11, wherein the non-ferromagnetic layer comprises a resin.

20. The magnetic tape of claim 11, wherein the non-ferromagnetic layer does not contain conductive inorganic particles.

21. The magnetic tape of claim 11, wherein the ferromagnetic layer comprises at least one of acicular particles, spindle-shaped particles, and tabular particles.

22. The magnetic tape of claim 11, wherein the non-ferromagnetic layer is substantially smooth.

* * * * *